Ü United States Patent [19]

Wilson

[11] Patent Number: 4,789,289
[45] Date of Patent: Dec. 6, 1988

[54] BALE LOADER, HANDLER AND FEEDER

[76] Inventor: Leon R. Wilson, P.O. Box 1612, Kalispell, Mont. 59901

[21] Appl. No.: 945,511

[22] Filed: Dec. 23, 1986

[51] Int. Cl.⁴ .............................................. B65G 67/02
[52] U.S. Cl. .................... 414/24.6; 29/564.3; 83/909; 241/101.7; 414/111; 414/493; 414/494; 414/505
[58] Field of Search ......................... 29/564.3; 83/909; 414/24.5, 24.6, 505, 518, 501, 503, 111, 493, 494; 241/101.07

[56] References Cited

U.S. PATENT DOCUMENTS

| | | | |
|---|---|---|---|
| 4,053,071 | 10/1977 | Schrag et al. | 414/501 X |
| 4,101,081 | 7/1978 | Ritter et al. | 414/24.5 X |
| 4,370,796 | 2/1983 | Wilson | 414/44 X |
| 4,441,845 | 4/1984 | Gibson | 414/24.6 |
| 4,573,845 | 3/1986 | Carpenter | 414/494 X |
| 4,621,776 | 11/1986 | Hostetler | 414/24.6 X |
| 4,657,191 | 4/1987 | Dwyer | 241/101.7 |
| 4,741,656 | 5/1988 | Bishop | 414/24.6 |

FOREIGN PATENT DOCUMENTS 2560488 9/1985 France ............................... 414/24.5

Primary Examiner—Robert J. Spar
Assistant Examiner—Janice Krizek
Attorney, Agent, or Firm—John J. Byrne

[57] ABSTRACT

Equipment for loading, moving and feeding round bales having a bale lifting mechanism, a T-bar to move the bales along a trailer bed surface and having a pair of tiltable platforms at the front of the trailer bed. One of the platforms is used to move the bale to the other platform and the second platform cooperates with a feeding drum to unwrap the bale substance in a controlled manner.

7 Claims, 4 Drawing Sheets

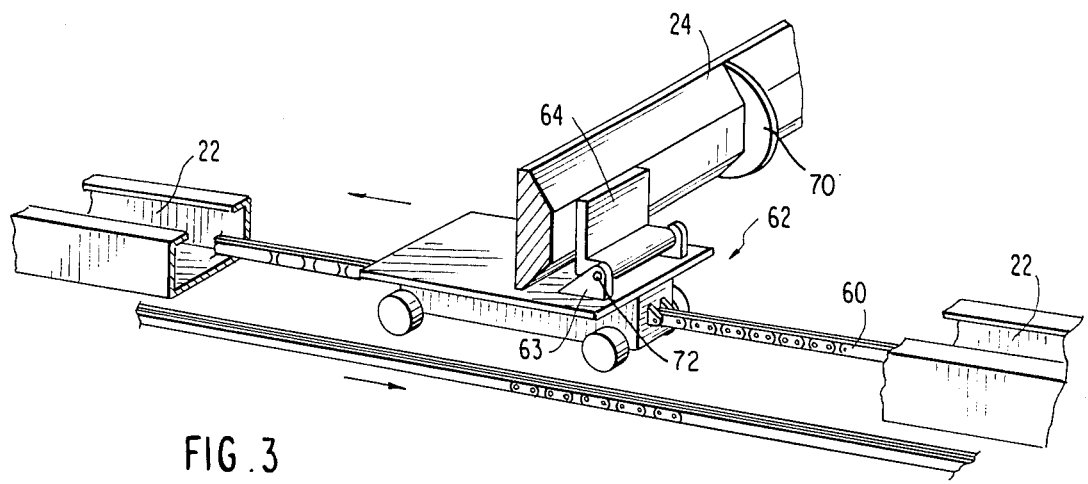
FIG. 3
FIG. 4
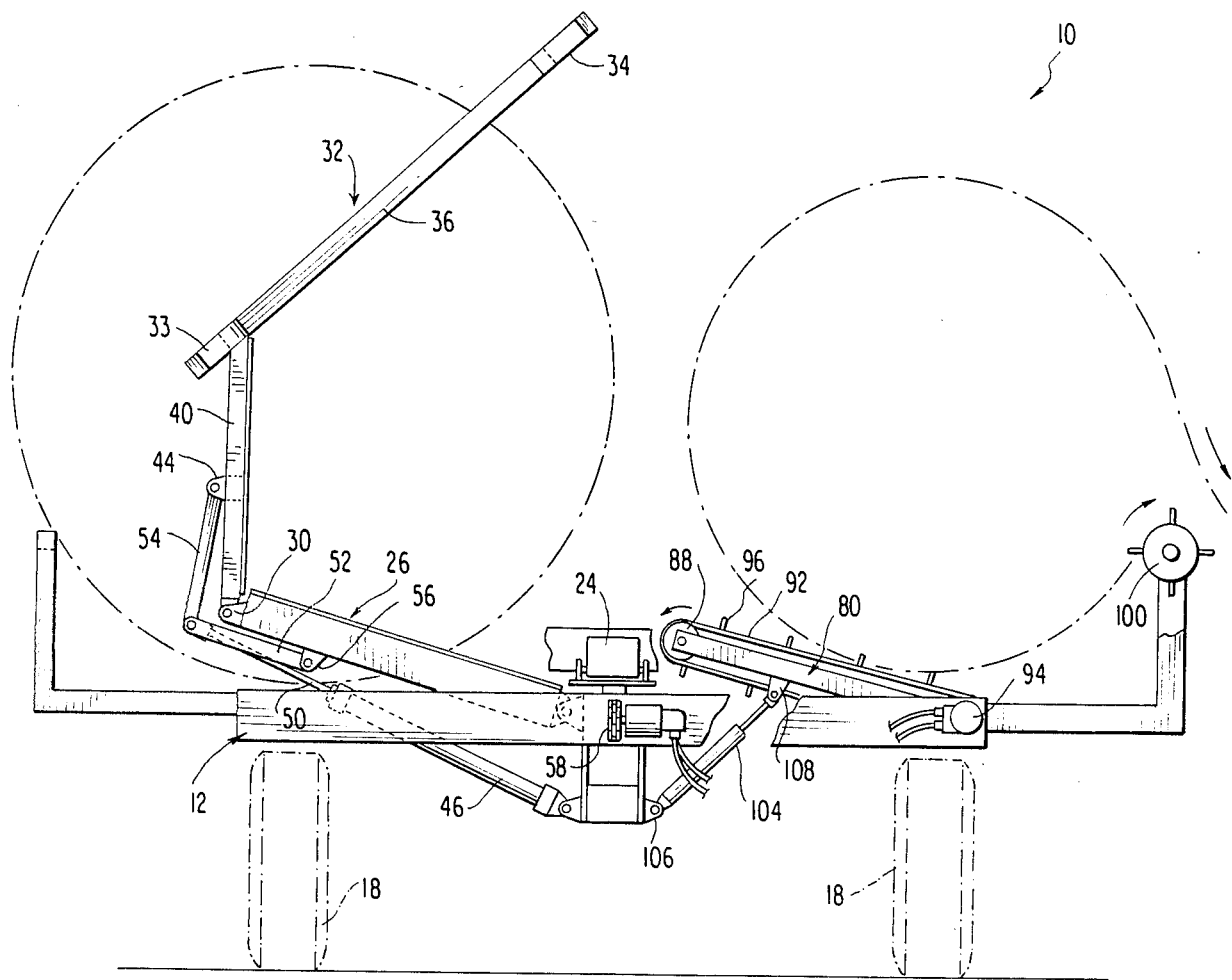

BALE LOADER, HANDLER AND FEEDER

FIELD OF INVENTION

The invention is a machine for loading and feeding a spirally wrapped round bale of hay. The invention relates to a bale support bed having an endless conveyor for movement of the bales along the bed; a feeding assembly for dispersal of the hay in windrow fashion; and an automatic twine cutter.

DESCRIPTION OF THE PRIOR ART

Recently, the baling of hay in rectangular bales was changed in large measure to spirally wrapped round bales. One reason for this change was to eliminate the costly binding material required to bind rectangular bales. Round bales present numerous problems. Basically, this is because the round bales typically weigh up to 1500 pounds. Feeding and handling is difficult. Various prior art devices have been utilized to feed such round bales; however, most of these have their own disadvantages.

One prior art device incorporates a trailer which has an endless belt conveyor for receiving the round bale and for unwrapping the bale. The bale is maintained on top of the conveyor by means of two retaining walls. Other devices incorporate spaced rollers for supporting and unwrapping the bale therebetween. These typically unwrap the bale in a direction longitudinal of a wheeled vehicle pulling the apparatus, which reduces the control of the feeding operation.

Other prior art devices include mechanisms for merely unwrapping the round bale by rolling it on the ground.

Another prior art device has a means to feed the bale via a rotary roller and a flat conveyor assembly to rotate the bale against the roller.

BRIEF SUMMARY OF THE INVENTION

The invention is directed toward a bale handler for lifting round bales to a wheeled platform and thereafter distributing the bales, normally hay, as feed. A flat bed, wheeled vehicle is towed and powered by a prime mover. The invention includes means to lift the baler to the vehicle bed and mover-cutter means to move the hay bales from the front to the rear by use of a horizontal T-bar which runs in a track at the longitudinal center of the trailer. The invention includes further means to distribute the hay via a combination of a tilting floor platform and a rotating cylinder or drum which distributes the hay evenly on the ground in a windrow after the binding cord has been cut.

BRIEF DESCRIPTION OF THE DRAWINGS

FIG. 3 is a diagrammatic view showing the T-bar cutter unit that moves in either direction from the front to the rear of the bale-receiving bed;

FIG. 4 is a diagrammatic front elevation showing the bale lifting apparatus.

DETAILED DESCRIPTION OF THE INVENTION

Figure 1:
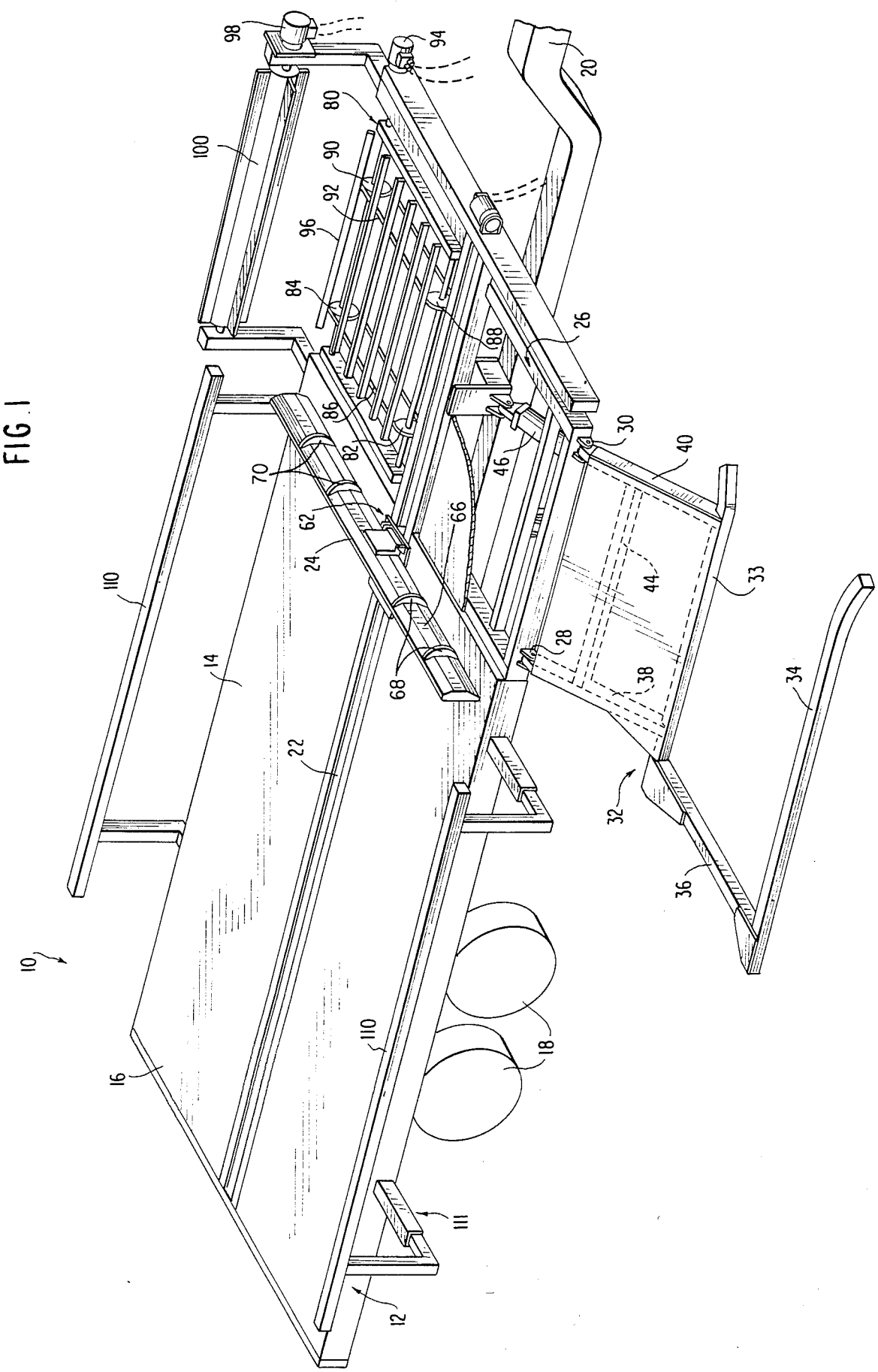
FIG. 1 is a diagrammatic perspective view showing the general elements of the invention.

Referring now to the drawings wherein like numerals indicate like parts, the numeral 10 indicates the bale handling equipment of this invention. A rectangular framework 12 supports a bed 14. Bed 14 is covered with metal sheet member 16. Bed 14 is supported by a plurality of wheels 18 in the conventional manner. The wheels 18 are connected to a conventional chassis, not shown, in particular in the drawings but which is connected to a draw bar 20.

Running the length of the chassis is a longitudinal groove 22. The groove or track 22 receives a sliding support of a T-bar unit 24 which will be described more in detail and with reference to FIG. 3.

To one side of groove 22, at the forward portion of the bale-receiving bed 14, is a pivoting platform 26. Pivotally mounted to platform 26 on brackets 28 and 30 is a bale pick-up assembly 32. The pick-up assembly consists generally of a pair of tines 33 and 34 connected by a member 36. The tines are supported by members 38 and 40 which have a reinforcing member 42 therebetween. A lug 45 is mounted intermediate the ends of member 42.

Figure 2:
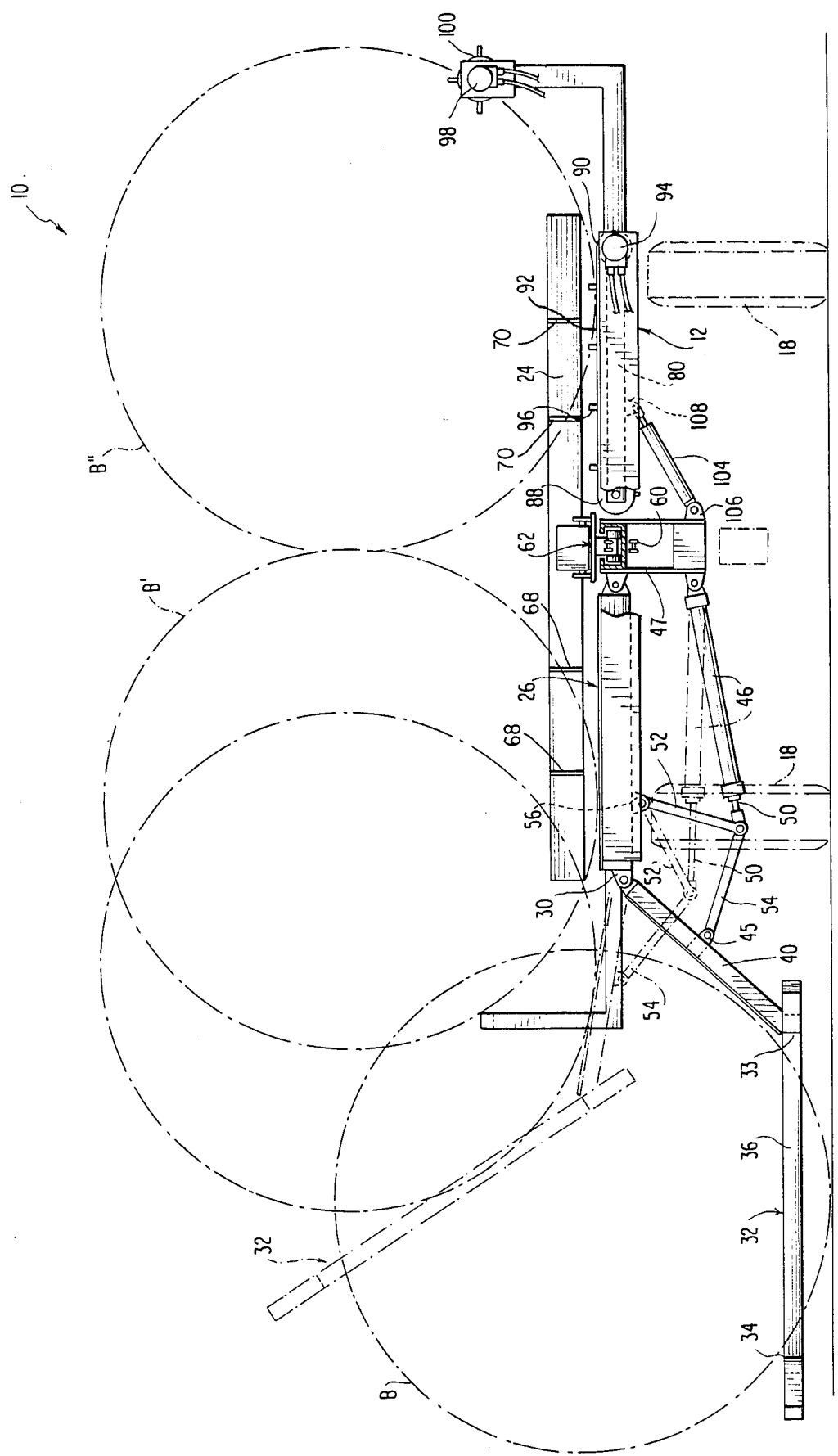
FIG. 2 is a diagrammatic front elevation showing the T-bar at the front of the chassis.
Figure 5:
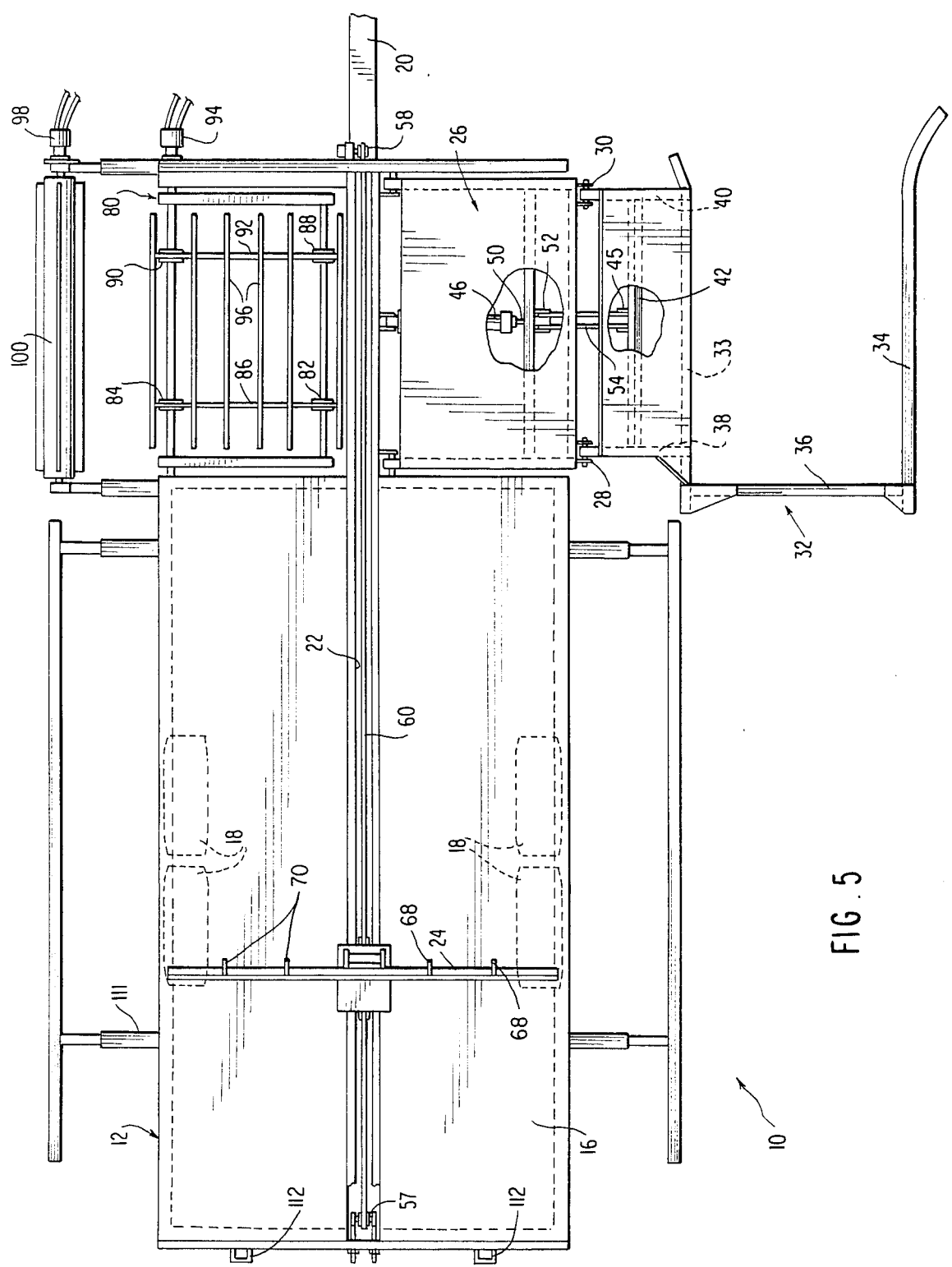
FIG. 5 is a diagrammatic plan view showing the general arrangement of the apparatus.

The bales to be handled are indicated by the letter B. As seen in FIG. 2, a bale B is receivable between the tines 33 and 34.

An expandable cylinder 46 has its base pivotally connected to an inside frame 47. Its piston 50 is pivotally connected to stabilizer 52. At its other end, the stabilizer member 52 is pivotally connected to platform 26 at lug 56. A second stabilizing bar 54 has its outer end pivotally connected to piston 50 and its other end pivotally connected to lug 45 on reinforcing bar 42.

The cylinder 46 is nested in FIG. 2. As the piston is moved outwardly, the assembly 32 is caused to rotate in a clockwise direction as viewed in FIG. 2. The bale is deposited to the B' position. The next bale will move bale B' to the B" position.

The first pair of bales loaded on the bed is moved to the rear platform by the T-bar assembly 24. Sprocket wheels 57 and 58 are mounted on either end of the groove 22 and receive an endless chain 60 thereabout. The chain is driven forward or to the rear by a conventional power drive means. A slide 62 moves along the groove and is carried by the chain 60. A member 64 is pivotally connected to the slide. The T-bar 24 is connected thereto and extends transversely across bed 14.

On its surface 66, the T-bar 24 is equipped with a pair of twine cutters 68 and 70. The T-bar 24 is in its movement position as seen in FIG. 3. It can be tilted downwardly. Brackets or lugs 63 are adapted to receive a pin 72 so that the T-bar can be pivoted.

In the loading mode, the T-bar is placed in its vertical position. The T-bar 24 is moved to the front of the bed and two bales are loaded side-by-side across the front of the unit. Then, the chain is moved rearwardly and the bales are pushed to the rear of the machine by the T-bar. Successive numbers of bales are loaded by way of the lifting assembly 32 and then moved to the rear until the bed is loaded.

When desired, the bales are unloaded from the rear end of the platform by tilting the bed upwardly and moving the prime mover forward. The T-bar is used as an assist if necessary.

In many instances, it is desired to feed the hay in a manner to make a continuous mound or windrow. The framework 80 is the principal component for windrow feeding. A pair of sprocket wheels 82 and 84 is mounted to framework 80 and carry an endless chain 86. The framework 80 also carries a pair of sprockets 88 and 90 which carry an endless chain 92.

The chains are driven by a motor 94. The chains carry a series of feeding rods 96 therebetween. The motor 94 is electrically connected to a second motor 98 that drives a feeding cylinder 100. Motors 94 and 98 are connected by a power arrangement so that the chains 86 and 92 are rotated in the opposite direction of the feed cylinder 100, the purpose of which is explained hereinafter.

As best seen in FIG. 4, a cylinder 104 has its base end pivotally connected to a lug 106 on the main framework and the distal end of its piston pivotally connected to a lug 108 of the framework 80 that carries the endless chains 86 and 92.

For feeding the circular bales, the endless chains of platform 80 are tilted to the position shown on FIG. 4. The peripheral surface of the bale comes in contact with unloading cylinder 100. As unloading cylinder 100 is driven in a clockwise fashion and as the chains 86, 92 are driven counterclockwise, the bales will rotate clockwise. As the bale rotates, a peripheral portion is scraped and falls to the ground. The height of the lineal windrow on the ground is determined by the speed of the prime mover.

The main elements of the above machine have been described diagrammatically so that the working elements can be understood and easily constructed by one skilled in the art.

The machine is adapted to handle round bales of all sizes. While the prior art shows machines that handle and feed round bales, this machine does it in a more efficient manner. It adjusts in size to fit the bales of different dimensions. It can pick them up from the field, deposit them in the storage area and remove them from the storage area for feeding in the winter. The equipment also automatically cuts the binding twine. This is all achieved without detracting from the principal purposes of the machine. The main vehicle bed is provided with a smooth metal surface for easy bale movement either to the front or to the back. Platforms 26 and 80 are supported by the frame so that they cannot go below the surface of the main bed 14 but are pivotable up to 90°.

The bale lifter is attached to platform 26. When the bale lifter or pick-up assembly 32 is flat on the ground, the prime mover is moved forwardly and maneuvered so that the tines 33 and 34 are disposed on either side of a bale B. The tines are spaced apart less than the diameter of the bale.

To lift, the cylinder 46 is expanded to the dotted line position shown in FIG. 2. As the cylinder expands further, the tines are moved over the bed as seen in FIG. 4. This causes the first bale to roll or be moved on the feeder platform 80. The assesmbly 32 is then ready to pick up another bale when pivoted to its ground position.

The vehicle bed has adjustable side rails 110 throughout. The telescoping supports 111 permit the equipment to receive bales of different diameters and also retain the bales on the platform.

While the bales are loaded, the T-bar 24 is at the very front of the platform. When two bales are loaded, the T-bar 24 can push the bales to the rear of the platform and then return to the front of the machine to move two additional bales to the back of the machine. This procedure is repeated until the wagon has a full complement of bales.

The bales are unloaded in two principal fashions. First, the rear rail 112 is removed and the chassis is tilted and the prime mover moved forwardly. The T-bar can be used as an aid. Second, the T-bar can be used as an aid to force the bales rearwardly and off of the bale-supporting bed.

The endless chain that moves the T-bar 24 engages an idler sprocket at one end and a power sprocket at the other. When power is applied, the T-bar is moved back and forth as desired. When the T-bar is in its 90° upright position, it can push the bales back to load the wagon. To feed the bales after the wagon is loaded, the T-bar is tilted down to its relatively flat position. The top of the T-bar is now lying on the slide plate toward the rear of the machine with the bottom of the T-bar facing forward. Sharp cutting bars are formed on the top section of the T-bar to sever the binding cords when desired.

To feed, the T-bar is moved backward, sliding under the first two bales. The sharp cutting edge of the knives will cut the bale strings. For the next rows of bales, the T-bar is moved to the rear (a mark on the chain is visible to the operator) and the chain is moved forward pulling the T-bar to a vertical position behind the two bales. The T-bar then pushes the two bales forward for disposition on the pivotable carriers. The tilting carrier 80 and the feeding drum 100 are the principal feeding mechanisms. The carrier is a frame with the drive shaft and two drive sprockets 88 and 90 connected to a power source. The idler sprockets oppose them on the other side of the chains. On these chains are welded rods 96 that run from front to rear. These bars act as slides when the T-bar moves the bales backward or forward but when a bale is in its feeding mode, the rods 96 turn the bale to unroll it.

The carrier 80 is pivotally mounted to the chassis. When the bale is ready to be fed, a hydraulic cylinder pivots the inside of the carrier toward the feeding drum. A cradle is formed for rolling the bales against the feeding drum 100. Since the feeding drum is a cylindrical tube with rough bars welded lengthwise thereof and it is powered in series with the platform chain, the chains and feeding drum move in opposite directions.

As the bale is turned, the drum peels a layer from the bale until the bale is fed out. It is immaterial which way the bale is rolled as long as the chain 86 and the drum 100 are rotated in opposite directions.

After the bale being fed is unwound, platform 26 is tilted by hydraulic cylinder 46 to approximately 70°. The second bale rolls over to chain carrier 80 and is fed in the fashion heretofore described. The windrow of fed material can be adjusted by adjusting the forward speed of the prime mover and/or changing the motor speed of the feeding drum. When the two front bales are fed, the T-bar will retrieve two additional bales and the process is repeated. The bale twine is severed as the T-bar 24 is moved to the rear.

A hydraulic cylinder can be provided to lift the tongue of the chassis. When the cylinder is extended, the entire chassis is permitted to tilt to the rear. Such operation is utilized when it is desired to lay the entire load of bales on the ground.

The embodiment which has been described herein and set forth by way of illustration should not be limited. It is apparent that many other embodiments will be apparent to those skilled in the art.

What is claimed is:

1. A bale loading, transporting, feeding and unloading apparatus comprising:

an elongated chassis mounted on wheels for towing by a prime mover;

an elongated bale supporting bed structure having an upper surface for supporting bales, said bed structure aligned over and supported by said chassis;

a power operated bale loader mounted upon said chassis adjacent one side of said bed structure for engaging a bale located on the ground and lifting it onto said bed structure;

said bed structure having a groove extending from front to rear;

said bed structure having a first tiltable platform at its front end adjacent to said bale loader and on one side of said groove on which a bale is placed by said bale loader;

said bed structure having a second tiltable platform adjacent said first tiltable platform and on the other side of said groove;

tilt means to tilt said first tiltable platform toward said second tiltable platform;

a side rail extending upwardly from said bed;

a toothed feeding cylinder rotatably mounted on the upper edge of said rail adjacent to said second tiltable platform;

a feeding conveyor mounted to said second tiltable platform; and drive means to rotate said feeding cylinder and said feeding conveyor in opposite directions to unroll and feed material from a bale.

2. The apparatus of claim 1 wherein said bed structure has a longitudinal length sufficient to receive a plurality of bales in end-to-end relationship on either side of said groove, a chain mounted in said groove for front-to-rear movement along the length of said bed structure;

power means to drive said chain;

a slide means connected to said chain and slidably mounted in said track;

a transverse T-bar connected to said slide means and extending across said bed.

3. The apparatus of claim 2 wherein said T-bar has a first side and a second side; and a plurality of blade structures on said first side.

4. Bale handling equipment comprising:

an elongated wheeled support chassis having a front end and a rear end, a tongue extending forwardly for a connection to a prime mover;

a bed structure supported by said chassis having a groove extending from front to rear;

a T-bar slidably received in said groove;

said bed structure having a rear portion and a front portion;

said front portion having first and second tiltable carriers, one on either side of said groove;

a bale lifting mechanism mounted to said chassis adjacent to said first tiltable carrier and mounted outwardly thereof;

power means for driving said bale lifting mechanism to lift a bale onto said first tiltable carrier;

tilt means to tilt said first tiltable carrier toward said second tiltable carrier;

a rail extending upwardly from said chassis adjacent said second tiltable carrier;

a rotating cylinder feeder mounted on said rail;

a plurality of endless chain feeders mounted to said second tiltable carrier for movement transverse to said chassis; and drive means to cause said rotating cylinder feeder and said chains to rotate in opposite directions to unroll and feed material from a bale.

5. The apparatus of claim 4 wherein said bed structure comprises a substantially continuous plate member having an upper surface free of obstruction to the sliding movement of bales therealong.

6. The apparatus of claim 5 wherein said bale lifting mechanism includes a supporting framework with two forwardly extending, horizontally disposed, and spaced apart tine members for sliding underneath a bale lying on the ground, said tine members being aligned in substantially the same horizontal direction as said elongated bed structure.

7. The apparatus of claim 6 wherein said tine members include distal portions which are spaced apart more than the remaining portions thereof.

* * * * *